C. BULLOCK.
Improvement in Tools for Enlarging Oil Wells.

No. 124,932.  Patented March 26, 1872.

Witnesses.
A B Richmond
H R McClintock

Inventor.
Chester Bullock

UNITED STATES PATENT OFFICE.

CHESTER BULLOCK, OF MEADVILLE, PENNSYLVANIA.

IMPROVEMENT IN TOOLS FOR ENLARGING OIL-WELLS.

Specification forming part of Letters Patent No. 124,932, dated March 26, 1872.

*To all whom it may concern:*

Be it known that I, CHESTER BULLOCK, of the city of Meadville, Pennsylvania, have invented a new and Improved "Tool for Drilling and Enlarging Oil-Wells;" and I do hereby declare that the following is a full and exact description of the same, reference being had to the accompanying drawing and the letters of reference marked thereon.

Figure 1:
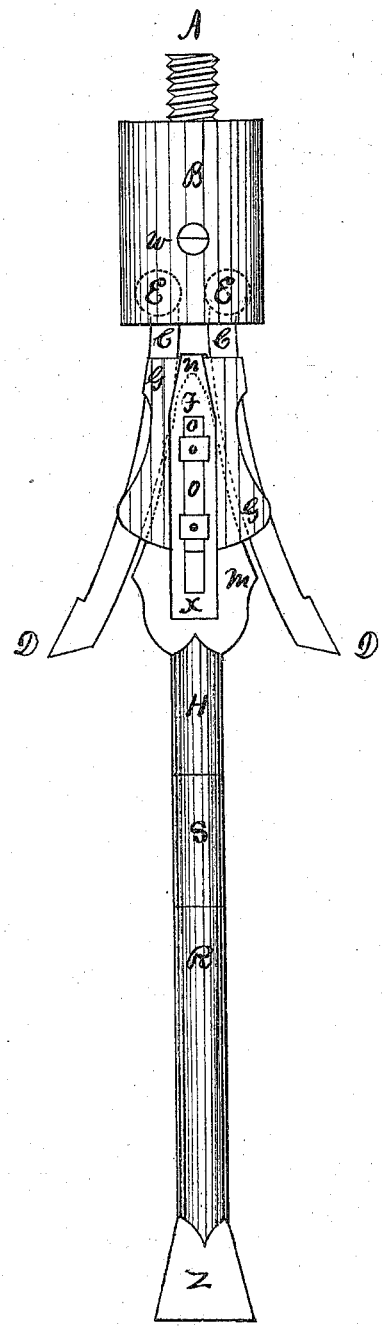
Figure 2:
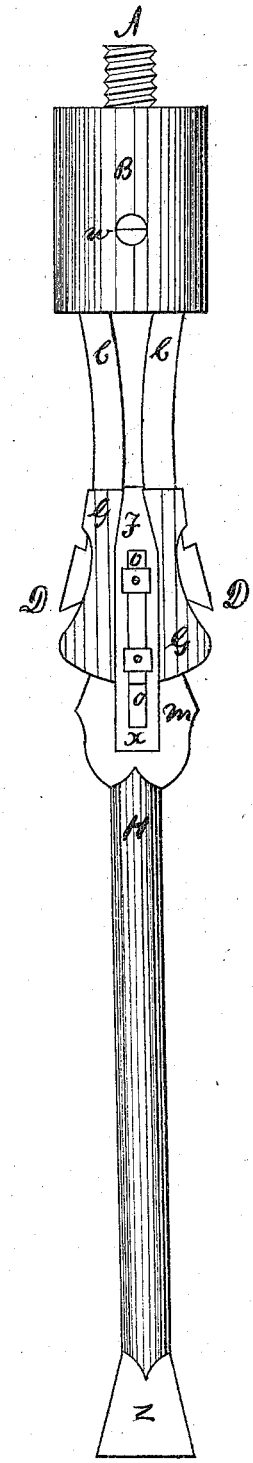

The object of my invention is as follows, to wit: When the drill reaches the "oil-bearing rock"—generally the "first, second, or third sand" rock—it is much to be desired to increase the size of the hole in the rock where the oil is deposited. By doing this the chances of "striking" an oil-crevice or vein are greatly increased, and this must be done by a tool that will pass down through a hole from five to eight inches in diameter, as that is the size that the wells are drilled. This object is accomplished by my invention in the following manner:

Figures 1 and 2 represent my invention in two positions: In Fig. 1 with the down-stroke, or in the position of cutting the rock; and Fig. 2 when the tool is drawn up, either to prepare for a blow, or for drawing it from the well.

A is a screw, by which the tool is attached to the shaft of the drill. B is the head of the tool, made in two parts, so that when the bolt W is removed it will come apart nearly in halves. D C C are two drills with two steel cutting-edges at D D. The upper ends of these drills end in round heads E E in the head B. R is another drill for first cutting a hole the size of the upper well. S is a section of the drill-shaft that may be unscrewed and removed, to be replaced by a longer or shorter piece or section, to lengthen or shorten the lower drill as may be desired. The upper part of the lower drill H ends in a wedge-shaped head, $m\ n$, which passes up between the two side drills D C D C, as shown by the dotted lines, Fig. 1. G G is a cap, which is bolted to the head $m\ n$ of the lower drill by two bolts, O O, these bolts O O passing through a slot in the gauge X X, as shown in the drawing, by which means the gauge is raised or lowered on the cap $m\ n$, thereby regulating the blow of the side drills D C D C.

The operation of my invention is as follows, to wit: The well to be enlarged has now reached the oil-bearing rock. The common drill used in the well so far is now removed and my drill put in its place. When the drill drops so that the end Z shall strike the rock at the bottom of the well, the head $m\ n$ is driven up between the side drills D C D C, and they are thrown out in the position shown by Fig. 1. When the blow is given, and the drill is drawn up for another blow, the side drills slide up through the cap G G, in the position shown in Fig. 2, which will allow the drill to pass up through a small hole. The width of the stroke of the side drills is regulated by the gauge X, which is raised or lowered on the cap G G by the bolts O O and slot, as before described. This gauge X is in the form of a stirrup, passing over the top of the cap G G and down both sides of it, so that the bolts O O will pass through a slot in both arms of the stirrup; and to prevent the blow of the drill driving this gauge down, a block of any desired length is placed under the stirrup and between it and the top of the cap G G. It will be seen that by this tool a hole can be drilled in the rock the diameter of the distance between D D, Fig. 1. And another important matter is that this tool acts as a "jar" as well as a drill, the shoulders of the steel-cutting part of the side drills D D, when drawn up, striking against the upper part of the cap G G, as shown, Fig. 2.

I claim—

The side drills D C, drill-head $m\ n$, and gauge X, operating in combination, by means substantially as described, for the purpose specified.

CHESTER BULLOCK.

Witnesses:
  A. B. RICHMOND,
  H. R. M'CLINTOCK.